US012699185B2

(12) United States Patent (10) Patent No.: US 12,699,185 B2
Hiller et al. (45) Date of Patent: Aug. 4, 2026

(54) LASER VEHICLE SPEED DETECTION SYSTEM

(71) Applicant: The Boeing Company, Chicago, IL (US)

(72) Inventors: Nathan D. Hiller, Irvine, CA (US); Robert M. Dowgwillo, St. Louis, MO (US); Ishaan Bakhle, Lynnwood, WA (US); Christopher Shoemaker, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 937 days.

(21) Appl. No.: 18/054,070

(22) Filed: Nov. 9, 2022

(65) Prior Publication Data

US 2024/0151848 A1    May 9, 2024

(51) Int. Cl.
   *G01F 3/36*      (2006.01)
   *G01S 7/4915*    (2020.01)
   *G01S 17/32*     (2020.01)
   *G01S 17/58*     (2006.01)
(52) U.S. Cl.
   CPC ............ *G01S 17/58* (2013.01); *G01S 7/4915* (2013.01); *G01S 17/32* (2013.01); *G01S 2205/005* (2013.01)
(58) Field of Classification Search
   CPC ........ G01S 17/58; G01S 17/32; G01S 7/4915; G01S 2205/005
   See application file for complete search history.

(56) References Cited

U.S. PATENT DOCUMENTS 5,587,785 A * 12/1996 Kato ....................... G01S 17/95
                                                        356/28
2005/0185191 A1* 8/2005 Shpantzer ................ G01H 9/00
                                                        356/485

(Continued)

FOREIGN PATENT DOCUMENTS

CN        106932785 A *  7/2017  ............. G01S 17/95
FR          2939202 A1 *  6/2010  ............. G01S 17/58

OTHER PUBLICATIONS

European Patent Office Extended Search Report, dated Mar. 1, 2024, regarding Application No. EP23200838.3, 4 pages.

(Continued)

*Primary Examiner* — Mark Hellner
(74) *Attorney, Agent, or Firm* — Yee & Associates, P.C.

(57) ABSTRACT

A method, apparatus, and system detects a speed of a vehicle. A backscatter light generated in response to transmitting a laser beam into an atmosphere during movement of the vehicle is received. A first beat frequency from interfering a first portion of the backscatter light with a reference light derived from the laser beam is measured. A time delay is introduced to a second portion of the backscatter light to form a time delayed backscatter light. A second beat frequency from interfering the time delayed backscatter light with the reference light is measured. The second beat frequency is time delayed from the first beat frequency. A difference between the first beat frequency and the second beat frequency is determined. The speed of the vehicle using the difference between the first beat frequency and the second beat frequency is determined.

22 Claims, 11 Drawing Sheets

(56)          References Cited

U.S. PATENT DOCUMENTS

| | | | |
|---|---|---|---|
| 2012/0274943 A1* | 11/2012 | Tumlinson | G01B 9/02058 |
| | | | 356/451 |
| 2016/0170023 A1* | 6/2016 | Rondeau | G01S 7/4917 |
| | | | 398/25 |
| 2016/0377721 A1 | 12/2016 | Lardin et al. | |
| 2017/0131081 A1* | 5/2017 | Lau | G01B 11/14 |
| 2020/0209020 A1* | 7/2020 | Issa | G01H 9/004 |
| 2022/0206150 A1* | 6/2022 | Remesch | G01S 7/4814 |
| 2022/0334256 A1* | 10/2022 | Michel | G01S 7/484 |

OTHER PUBLICATIONS

Lawrence et al., "Optical Radar Studies of the Atmosphere," NASA Langley Research Center, Fifth Symposium on Remote Sensing of Environment, Jan. 1, 1968, 9 pages.
Post et al., "Observations of Pinatubo ejecta over Boulder, Colorado by lidars of three different wavelengths," Geophysical Research Letters, Jan. 24, 1992, vol. 19, No. 2, pp. 195-198.
Vaughan, "Remote optical sensing by laser," Handbook of Opto-electronics—Second Edition, CRC Press, 2017, pp. 431-504.
Zalach et al., "A Method for Retrieving Stratospheric Aerosol Extinction and Particle Size from Ground-Based Rayleigh-Mie-Raman Lidar Observations," MDPI, Atmosphere, Jul. 22, 2020, vol. 11, No. 8, 18 pages.

* cited by examiner

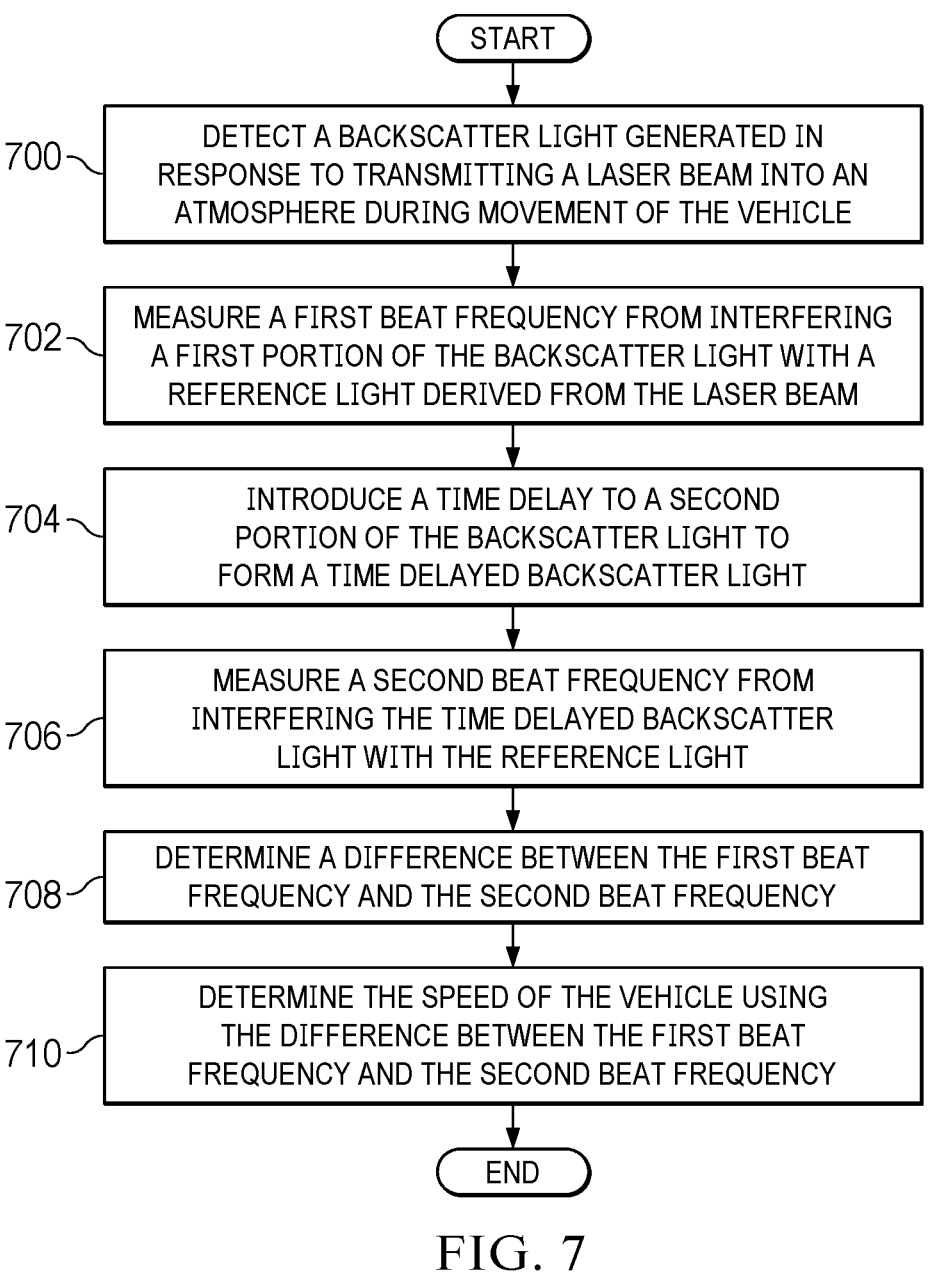

START

700 — DETECT A BACKSCATTER LIGHT GENERATED IN RESPONSE TO TRANSMITTING A LASER BEAM INTO AN ATMOSPHERE DURING MOVEMENT OF THE VEHICLE

702 — MEASURE A FIRST BEAT FREQUENCY FROM INTERFERING A FIRST PORTION OF THE BACKSCATTER LIGHT WITH A REFERENCE LIGHT DERIVED FROM THE LASER BEAM

704 — INTRODUCE A TIME DELAY TO A SECOND PORTION OF THE BACKSCATTER LIGHT TO FORM A TIME DELAYED BACKSCATTER LIGHT

706 — MEASURE A SECOND BEAT FREQUENCY FROM INTERFERING THE TIME DELAYED BACKSCATTER LIGHT WITH THE REFERENCE LIGHT

708 — DETERMINE A DIFFERENCE BETWEEN THE FIRST BEAT FREQUENCY AND THE SECOND BEAT FREQUENCY

710 — DETERMINE THE SPEED OF THE VEHICLE USING THE DIFFERENCE BETWEEN THE FIRST BEAT FREQUENCY AND THE SECOND BEAT FREQUENCY

END

1302 — SPECIFICATION AND DESIGN

1304 — MATERIAL PROCUREMENT

1306 — COMPONENT AND SUBASSEMBLY MANUFACTURING

1308 — SYSTEM INTEGRATION

1310 — CERTIFICATION AND DELIVERY

1312 — IN SERVICE

1314 — MAINTENANCE AND SERVICE

1400

AIRCRAFT

1402 — AIRFRAME     INTERIOR — 1406

SYSTEMS

PROPULSION SYSTEM     ELECTRICAL SYSTEM 1408   1412     1410   1414

HYDRAULIC SYSTEM     ENVIRONMENTAL SYSTEM

1404

LASER VEHICLE SPEED DETECTION SYSTEM

BACKGROUND INFORMATION

1. Field

The present disclosure relates generally to sensors and in particular, to a method, apparatus, system for detecting a speed of a moving vehicle.

2. Background

A sensor such as a pitot tube is used to detect the speed of an aircraft. However, this type of sensor protrudes from the surface of aircraft to place the pitot tube into the airflow. This protrusion makes this type of sensor susceptible to environmental conditions. For example, the unintended impacts, such as bird or insect strikes, can occur on a pitot tube. Other environmental issues include ice formation on the pitot tube.

Another type of sensor used for detecting airspeed is a light detection and ranging (LIDAR) sensor. With a LIDAR sensor, a laser beam is transmitted into the air and backscatter generated in response to the laser beam is detected. The airspeed of the aircraft can be determined by comparing the frequency of the laser beam to the frequency in the backscatter. This shift in frequency can be used to calculate the speed of the aircraft.

SUMMARY

An embodiment of the present disclosure provides a method that detects a speed of a vehicle. A backscatter light generated in response to transmitting a laser beam into an atmosphere during movement of the vehicle is received. A first beat frequency from interfering a first portion of the backscatter light with a reference light derived from the laser beam is measured. A time delay is introduced to a second portion of the backscatter light to form a time delayed backscatter light. A second beat frequency from interfering the time delayed backscatter light with the reference light is measured. The second beat frequency is time delayed from the first beat frequency. A difference between the first beat frequency and the second beat frequency is determined. The speed of the vehicle using the difference between the first beat frequency and the second beat frequency is determined.

In another embodiment of the present disclosure, a method detects a speed of an aircraft. A laser beam is transmitted into an atmosphere from an aircraft during flight of the aircraft. A backscatter light generated in response to transmitting the laser beam is received. A first beat frequency from interfering a first portion of the backscatter light with a reference light derived from the laser beam is measured. A time delay is introduced to a second portion of the backscatter light to form a time delayed backscatter light. A second beat frequency from interfering the time delayed backscatter light with the reference light is measured. A difference between the first beat frequency and the second beat frequency is determined. A speed of the aircraft is determined using the beat frequency and the difference.

In yet another embodiment of the present disclosure, a speed detection system comprises a laser beam generator, an interference system, a detector system, and a speed analyzer. The laser beam generator is configured to emit a laser beam into an atmosphere from a vehicle. The interference system is configured to interfere a first portion of a backscatter light detected with a reference light to form a first beat frequency, introduce a time delay to a second portion of the backscatter light to form a time delayed backscatter light, and interfere a time delayed backscatter light with the reference light to form a second beat frequency. The backscatter light received in response to the laser beam being emitted into the atmosphere and the reference light is derived from the laser beam. The detector system is configured to measure a first beat frequency from interfering the first portion of the backscatter light with the reference light and measure a second beat frequency from interfering the time delayed backscatter light with the reference light. The speed analyzer is configured to determine a speed to the vehicle using the first beat frequency and a difference between the first beat frequency and the second beat frequency.

In still another embodiment of the present disclosure, a speed detection system comprises a laser beam generator, a first path, a second path, and a speed analyzer. The laser beam generator is configured to emit a laser beam into an atmosphere from a vehicle. The first path interferes a first portion of a backscatter light received with a reference light and measures a first beat frequency from the first portion of the backscatter light interfered with the reference light. The second path introduces a time delay to a second portion of the backscatter light to form a time delayed backscatter light, interferes a time delayed backscatter light with the reference light, and measures a second beat frequency from interfering the time delayed backscatter light with the reference light. The speed analyzer is connected to the first path and the second path in which the speed analyzer receives the first beat frequency from the first path, receive the second beat frequency from the second path, and determines a speed of the vehicle using the first beat frequency and determines the speed using the second beat frequency in response to the first path being out of tolerance.

In another embodiment of the present disclosure, a speed detection system comprises a laser beam generator, an interference system, a detector system, and a speed analyzer. The laser beam generator is configured to emit a laser beam into an atmosphere from a vehicle. The interference system is configured to interfere a first portion of a backscatter light received with a reference light to form a first beat frequency, introduce a time delay to a second portion of the backscatter light to form a time delayed backscatter light, and interfere a time delayed backscatter light with the reference light to form a second beat frequency. The backscatter light received in response to the laser beam being emitted into the atmosphere and the reference light is derived from the laser beam. The detector system is configured to measure a first beat frequency from frequency from interfering the first portion of the backscatter light with the reference light and measure a second beat frequency from interfering the time delayed backscatter light with the reference light. The speed analyzer is configured to determine a first speed using the first beat frequency, determine a second speed using the second beat frequency, determine a third speed using a difference between the first beat frequency and the second beat frequency, and determine the speed for the vehicle as an average of the first speed, the second speed, and the third speed.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of a flowchart of a process for determining speed for a vehicle aircraft in accordance with an illustrative embodiment;

DETAILED DESCRIPTION

Figure 1:
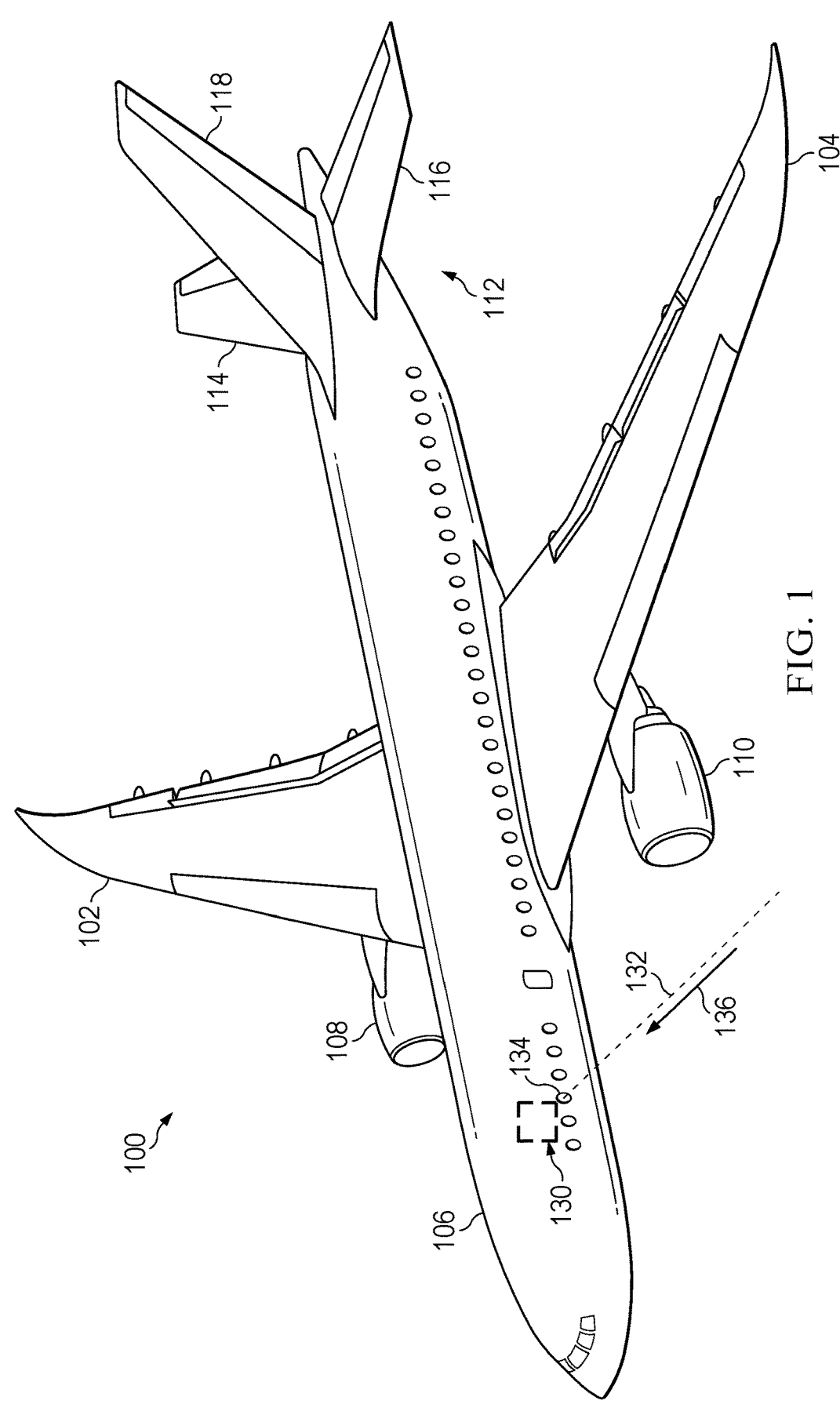
FIG. 1 is an illustration of an aircraft in accordance with an illustrative embodiment.

The illustrative embodiments recognize and take into account one or more different considerations as described herein. For example, the illustrative embodiments recognize and take into account that when using a laser beam to detect speed, the aircraft transmits a laser beam and compares that transmitted light to light received in response to transmission of the laser beam. Aircraft transmits the laser beam into the air which encounters airborne particles. For example, with a coherent LIDAR system, a small fraction of laser beam is scattered by ice crystals, dust, and other particles. This scattering results in a shift in frequency. Some of the scattered light reaches the aircraft and is detected as backscatter.

However, at different altitudes different amounts of particles may be present. For example, at lower elevations, plenty of particles are present to scatter a laser beam. This lower elevation can be, for example, 20,000 feet to 30,000 feet. As result, the backscatter detected at this lower elevation is greater than at a mid-elevation. The mid-elevation elevation can be, for example, 30,000 feet to 40,000 feet. At a mid-elevation, fewer particles are present to scatter the laser beam. As a result, a weaker backscatter is detected by the aircraft. At a high elevation above the mid-elevation, plenty of particles are present resulting in a stronger backscatter being detected as compared to the mid-elevation. As a result, at mid-altitudes, the power of the backscatter light detected can be low enough to reduce performance in detecting the speed of the aircraft.

Thus, the illustrative embodiments provide a method, apparatus, and system that detects a speed of a vehicle. A backscatter light generated in response to transmitting a laser beam into an atmosphere during movement of the vehicle is detected. A first beat frequency from interfering a first portion of the backscatter light with a reference light derived from the laser beam is measured. A time delay is introduced to a second portion of the backscatter light to form a time delayed backscatter light. A second beat frequency from interfering the time delayed backscatter light with the reference light is measured. The second beat frequency is time delayed from the first beat frequency. A difference between the first beat frequency and the second beat frequency is determined. The speed of the vehicle using the difference between the first beat frequency and the second beat frequency is determined.

Additionally, at least one of the first beat frequency or the second beat frequency can also be used to determine speed in addition to using the difference between the first beat frequency and the second beat frequency. The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

With reference now to the figures, and in particular, with reference to FIG. 1, an illustration of an aircraft is depicted in accordance with an illustrative embodiment. In this illustrative example, commercial airplane 100 has wing 102 and wing 104 attached to body 106. Commercial airplane 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Commercial airplane 100 is an example of an aircraft in which speed detection system 130 can be implemented in accordance with an illustrative embodiment. In this illustrative example, speed detection system 130 can operate to emit laser beam 132 from window 134 and detect backscatter 136 generated in response to emitting laser beam 132. Laser beam 132 and backscatter 136 can be compared to determine the speed of commercial airplane 100.

In this illustrative example, speed detection system 130 can increase performance in detecting speed of commercial airplane 100 through introducing a time delay in backscatter 136. This time delayed backscatter can be compared to a reference light generated from laser beam 132. This comparison can provide increased performance in determining speed of commercial airplane 100. Additionally, this difference can be used along with determining a beat frequency from the interference of a reference light derived from laser beam 132 and backscatter 136. This additional feature can provide an increase in performance in detecting the speed of commercial airplane 100.

This increased performance can be especially useful at elevations where fewer airborne particles are present. As a result, speed detection system 130 can reduce issues with elevations such as mid-elevations where fewer particles are present to scatter laser beam 132. As a result, using at least one of a beat frequency or a time delay in the beat frequencies can provide increase performance as compared to currently available speed detection systems using laser beams.

Figure 2:
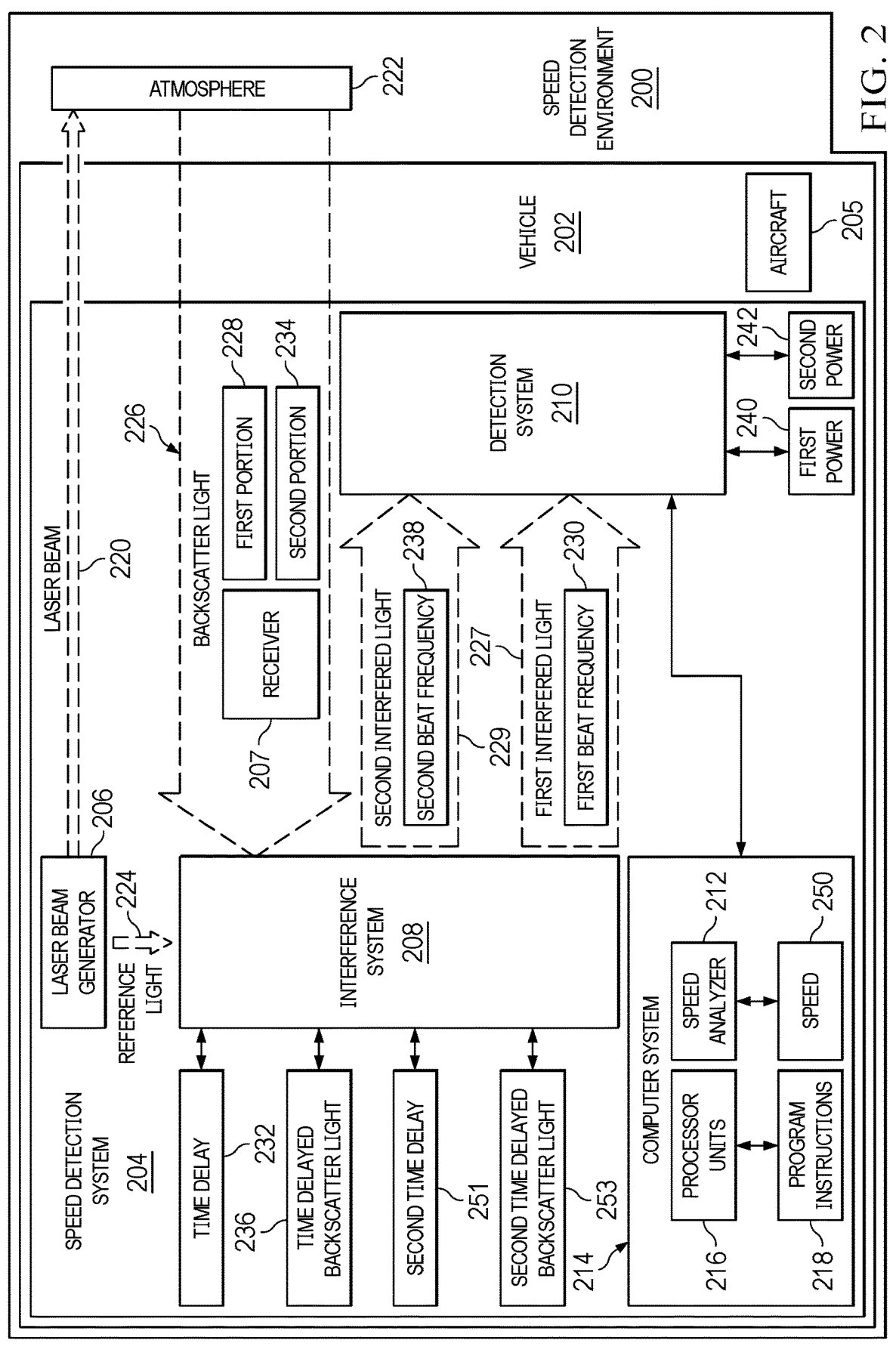
FIG. 2 is a block diagram of a speed detection environment in accordance with an illustrative embodiment.

With reference now to FIG. 2, a block diagram of a speed detection environment is depicted in accordance with an illustrative embodiment. In this illustrative example, speed detection environment 200 is an environment in which the speed for vehicle 202 can be detected using speed detection system 204. In this example, vehicle 202 can take the form of aircraft 205. Commercial airplane 100 in FIG. 1 is an example of one implementation for aircraft 205. Vehicle 202 can be selected from a group comprising a mobile platform, aircraft, commercial airplane 100, a cargo airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, an automobile, a motorcycle, and other suitable vehicles.

In this illustrative example, speed detection system 204 comprises a number of different components. As depicted, speed detection system 204 comprises laser beam generator 206, receiver 207, interference system 208, detection system 210, and speed analyzer 212. With the use of laser beam generator 206 to generate laser beam 220, speed detection system 204 can be a LIDAR system.

Speed analyzer 212 can be implemented in software, hardware, firmware or a combination thereof. When software is used, the operations performed by speed analyzer 212 can be implemented in program instructions configured to run on hardware, such as a processor unit. When firmware is used, the operations performed by speed analyzer 212 can be implemented in program instructions and data and stored in persistent memory to run on a processor unit. When hardware is employed, the hardware may include circuits that operate to perform the operations in speed analyzer 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this example, speed analyzer 212 can be located in computer system 214. Computer system 214 is a physical hardware system and includes one or more data processing systems. When more than one data processing system is present in computer system 214, those data processing systems are in communication with each other using a communications medium. The communications medium may be a network. The data processing systems may be selected from at least one of a computer, a server computer, a tablet, or some other suitable data processing system.

As depicted, computer system 214 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. When the number of processor units 216 execute program instructions 218 for a process, the number of processor units 216 can be one or more processor units that are on the same computer or on different computers. In other words, the process can be distributed between processor units 216 on the same or different computers in a computer system 214. Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, laser beam generator 206 is configured to emit laser beam 220 into atmosphere 222 from vehicle 202. In this illustrative example, laser beam generator 206 can also generate reference light 224. In this depicted example, reference light 224 is derived from laser beam 220 and has the same characteristics as laser beam 220. For example, reference light 224 can have the same frequency and phase as laser beam 220.

In one illustrative example, reference light 224 can be a portion of the coherent light that laser beam generator 206 generates and uses to emit laser beam 220. In another illustrative example, reference light 224 can be derived from laser beam 220 by being split from laser beam 220. In this example, reference light 224 can be a portion of laser beam 220. In this illustrative example, laser beam generator 206 is in communication with interference system 208. For example, laser beam generator 206 can send reference light 224 to interference system 208.

As depicted, receiver 207 is a physical device that receives backscatter light 226 in response to the emission of laser beam 220 into atmosphere 222. In this illustrative example, receiver 207 can be, for example, a structure containing lenses that receive backscatter light 226. In one illustrative example, receiver 207 can be a telescope.

As depicted, receiver 207 is in communication with interference system 208. Receiver 207 can send backscatter light 226 received by receiver 207 to interference system 208.

In this illustrative example, interference system 208 is a physical system and operates to interfere first portion 228 of backscatter light 226 detected with reference light 224 to form first interfered light 227 with first beat frequency 230, introduce time delay 232 to second portion 234 of the backscatter light 226 to form time delayed backscatter light 236, and interfere time delayed backscatter light 236 with reference light 224 to form second interfered light 229 with second beat frequency 238. Time delay 232 can be dependent on a frequency of backscatter light 226.

In this illustrative example, detection system 210 is in communication with interference system 208. This is a physical component that receives first interfered light 227 and second interfered light 229 from interference system 208. Detection system 210 detects first beat frequency 230 in first interfered light 227 and second beat frequency 238 in second interfered light 229.

In this illustrative example, detection system 210 detects first power 240 for first interfered light 227 and second power 242 for second interfered light 229. First power 240 and second power 242 can have an amplitude that increases and decreases with a frequency that is based on the interference of backscatter light 226 and time delayed backscatter light 236 with reference light 224. The frequency of first power 240 is first beat frequency 230 and the frequency of second power 242 is second beat frequency 238 in this example.

Speed analyzer 212 in computer system 214 is in communication with detection system 210. In this illustrative example, speed analyzer 212 receives first beat frequency 230 and second beat frequency 238 from detection system 210. Speed analyzer 212 determines speed 250 for aircraft 205. Speed 250 can be the airspeed of aircraft 205 during flight of aircraft 205.

Thus, speed detection system 204 can determine speed 250 for vehicle 202 with increased accuracy. The use of first beat frequency 230, second beat frequency 238, and the difference between these two beat frequencies can provide increased accuracy in determining speed.

For example, speed analyzer 212 can determine speed 250 using the difference between first beat frequency 230 and second beat frequency 238. This difference can be the difference in phase or time.

In another illustrative example, speed analyzer 212 can determine a first speed using first beat frequency 230 and a second speed using the difference between first beat frequency 230 and second beat frequency 238. These two speeds can be used to determine speed 250.

In another illustrative example, speed analyzer 212 can determine a first speed using second beat frequency 238 and a second speed using the difference between first beat frequency 230 and second beat frequency 238. Speed 250 can be determined from these two speeds.

In yet another illustrative example, speed analyzer 212 can determine a first speed using first beat frequency 230, a second speed using second beat frequency 238, and a third speed using the difference between first beat frequency 230 and second beat frequency 238. These three speeds can be analyzed to determine speed 250. For example, the three speeds can be averaged to determine speed 250.

As a result, speed 250 can be determined using different combinations of first beat frequency 230, second beat frequency 238, and a difference between first beat frequency 230 and second beat frequency 238. The selection of which information to use can depend on the amount of backscatter light 226 that is received. In environmental conditions where lower levels of backscatter light 226, the additional information can provide increased accuracy as compared to using only a beat frequency or a difference between a beat frequency to determine speed 250.

In yet another illustrative example, interference system 208 can introduce second time delay 251 to first portion 228 of backscatter light 226 that is opposite to time delay 232. This second time delay results in second time delayed backscatter light 253. As result, the difference between first interfered light 227 using second time delayed backscatter light 253 and second interfered light 229 using time delayed backscatter light 236 is greater than using just time delay 232. This additional time delay in the opposite direction of time delay 232 can provide a greater difference for use in determining speed 250.

Figure 3:
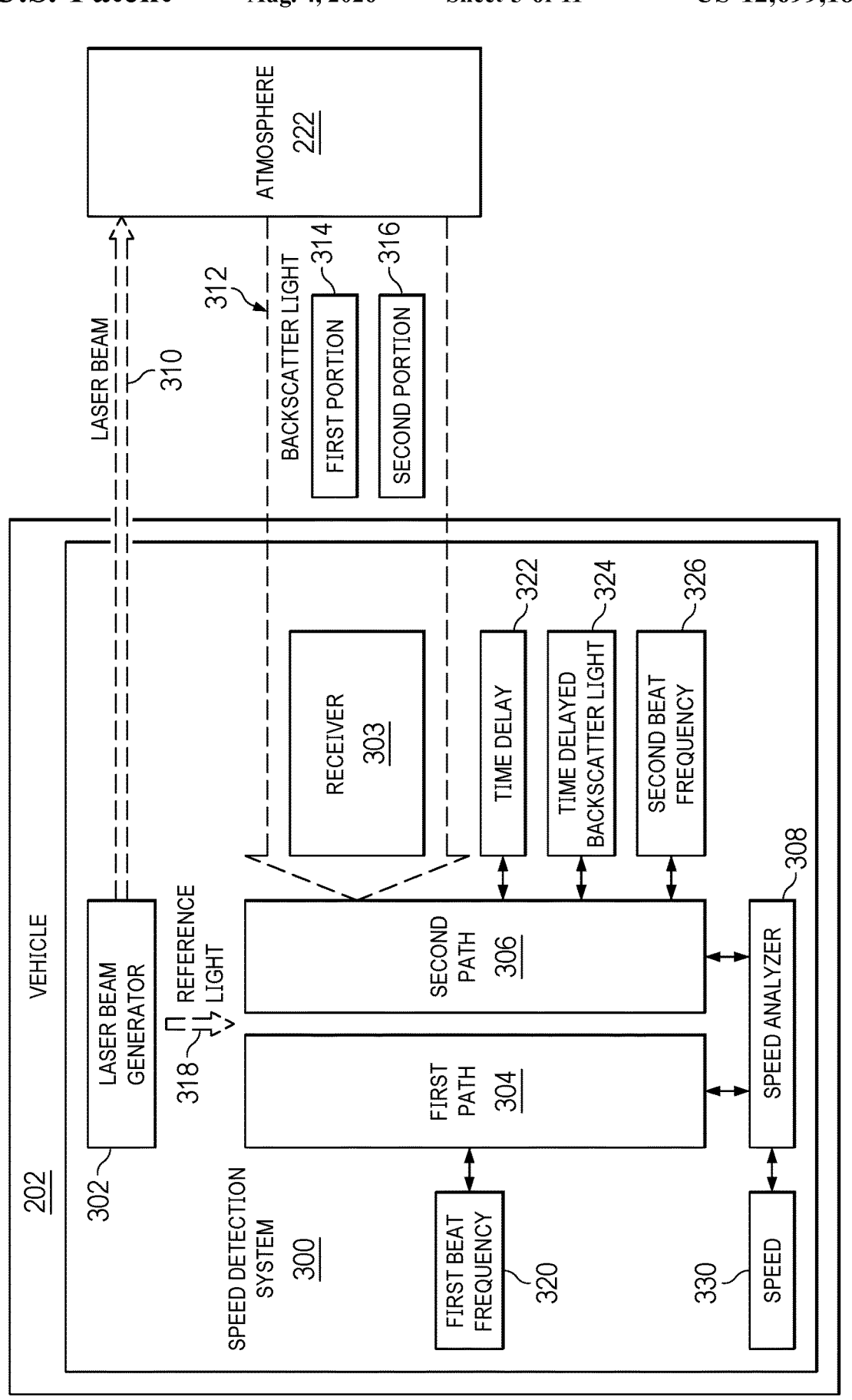
FIG. 3 is an illustration of a speed detection system in accordance with an illustrative embodiment.

Turning next to FIG. 3, an illustration of a speed detection system is depicted in accordance with an illustrative embodiment. In the illustrative examples, the same reference numeral may be used in more than one figure. This reuse of a reference numeral in different figures represents the same element in the different figures.

In this illustrative example, speed detection system 300 is an example of a speed detection system that can be implemented in vehicle 202 in speed detection environment 200 in FIG. 2. In this depicted example, speed detection system 300 implements redundancy for detecting the speed of aircraft 205. In this illustrative example, speed detection system 300 comprises a number of different components. As depicted, speed detection system 300 comprises laser beam generator 302, receiver 303, first path 304, second path 306, and speed analyzer 308.

In this example, first path 304 and second path 306 are comprised of hardware components though which light can propagate. In this illustrative, second path 306 can be a redundant path to first path 304. In other words, speed detection is performed using first path 304 until one or more components in first path 304 are unable to perform within a desired level or meet a specified tolerance. In response to this condition, the speed detection can be performed using second path 306.

Further, in addition to redundancy, both paths can be used to provide increased accuracy in speed detection at elevations. The use of both paths can provide increased performance in speed detection when particle concentrations are not sufficient to provide a desired level of accuracy while using only a single path such as first path 304.

In this illustrative example, laser beam generator 302 is configured to emit laser beam 310 into atmosphere 222 from vehicle 202. As depicted, receiver 303 is a physical device that receives backscatter light 226 in response to the emission of laser beam 310 into atmosphere 222.

As depicted, receiver 303 is a physical device that receives backscatter light 312 in response to the emission of laser beam 310 into atmosphere 222.

Receiver 303 is in communication with first path 304 and second path 306. First portion 228 of backscatter light 312 is sent from receiver 303 through first path 304. Second portion 316 of backscatter light 312 is sent from receiver 303 through second path 306.

In this illustrative example, first path 304 receives first portion 314 of backscatter light 312 detected with reference light 318 from laser beam generator 302. First path 304 measures first beat frequency 320 from first portion 314 of backscatter light 312 interfered with reference light 318.

In this depicted example, second path 306 introduces time delay 322 to second portion 316 of the backscatter light 312 to form time delayed backscatter light 324, interferes time delayed backscatter light 324 with reference light 318, and measures second beat frequency 326 from interfering time delayed backscatter light 324 with reference light 318.

As depicted, speed analyzer 308 is in communication with first path 304 and second path 306. In this illustrative example, speed analyzer 308 receives first beat frequency 320 from first path 304 and receives second beat frequency 326 from second path 306.

Speed analyzer 308 can determine speed 330 of vehicle 202 using first beat frequency 320. Further speed analyzer 308 can determine speed 330 using second beat frequency 238 in response to first path 304 being out of tolerance for a desired level of accuracy. First path 304 can be out of tolerance by a component in first path 304 that fails or no longer operates within a specified tolerance. As a result, redundancy is provided by using second path 306 for speed detection. In another example, second path 306 can be the primary or normally used path with first path 304 providing redundancy.

As a further benefit, in addition to providing redundancy, speed detection system 204 can also operate to provide increased precision in speed detection by using first beat frequency 320 and second beat frequency 326 to determine speed 330.

In one illustrative example, one or more technical solutions are present that overcome a technical problem with using laser sensors to detect speed in vehicle such as aircraft. The frequency shift between the emitted laser light and the received backscatter light is sufficiently small such that detecting a frequency shift by interfering the backscatter light with a reference light may not provide sufficient information to determine speed with the desired level accuracy.

As a result, one or more technical solutions can provide a technical effect providing sufficient information to determine speed for a vehicle such as aircraft. In one illustrative example, two beat frequencies can be determined in which a first beat frequency is determined using the backscatter light and the reference light and a second beat frequency is determined using a time delayed backscatter light and the reference light. The difference between the two beat frequencies can provide sufficient information to determine speed with the desired level accuracy. In other illustrative examples, this difference can be used to determine speed along with at least one of the first beat frequency or the second beat frequency. As a result, improved performance in detecting speed by a laser beam based speed detection system can occur.

The illustration of speed detection environment 200 and the different components in FIG. 2 and FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more laser beams in addition, laser beam 220 can be emitted by laser beam generator 206 at least one of a different frequency, a different phase, or different amplitude in which backscatter light for these additional laser beams are received by receiver 207 in addition to backscatter light 226. This additional backscatter light can be processed with backscatter light 226 to determine speed 250.

Figure 4:
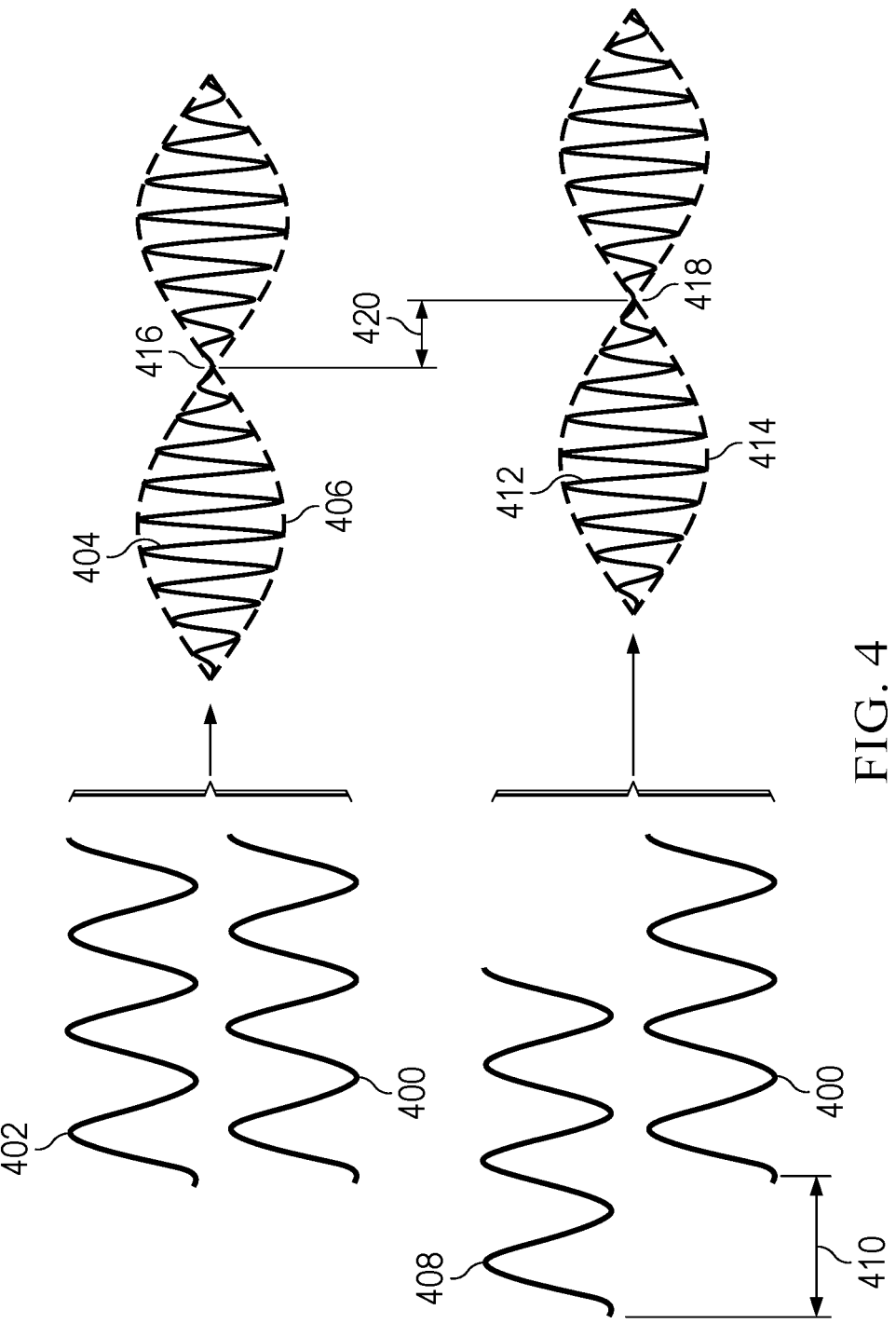
FIG. 4 is an illustration of light used to determine the speed of the vehicle in accordance with an illustrative embodiment.

Turning next to FIG. 4, an illustration of light used to determine the speed of the vehicle is depicted in accordance with an illustrative embodiment. In this illustrative example, reference light 400 and backscatter light 402 are coherent light and each has a frequency. Reference light 400 and backscatter light 402 can have a slightly different frequency from each other such that the interference of the reference light 400 and backscatter light 402 will have a beat frequency.

For example, when reference light 400 and backscatter light 402 is interfered or combined with each other, first interfered light 404 with first beat frequency 406 occurs. In this example, first beat frequency 406 can be measured by measuring the power of first interfered light 404. First beat frequency 406 can be used to determine the speed of the vehicle.

In this example, additional information can be obtained using reference light 400 and time delayed backscatter light 408. In this depicted example, time delayed backscatter light 408 is a time delayed version of backscatter light 402. As depicted, time delayed backscatter light 408 has been shifted by time delay 410 relative to backscatter light 402.

Reference light 400 and time delayed backscatter light 408 can be interfered or combined to form second interfered light 412 having second beat frequency 414. In this illustrative example, first beat frequency 406 has a phase difference from second beat frequency 414. For example, the difference in phase can be measured relative to a reference point in these two interfered lights.

For example, node 416 in first interfered light 404 can be compared to node 418 in second interfered light 412. In this example, these nodes are reference points where the power is zero. In this example, phase shift 420 is present.

Using first beat frequency 406 or second beat frequency 414 with phase shift 420 to determine speed increases performance in detecting the speed of the vehicle. In this example, both the frequency and time delay difference can be used to increase the accuracy in which speed can be determined.

Figure 5:
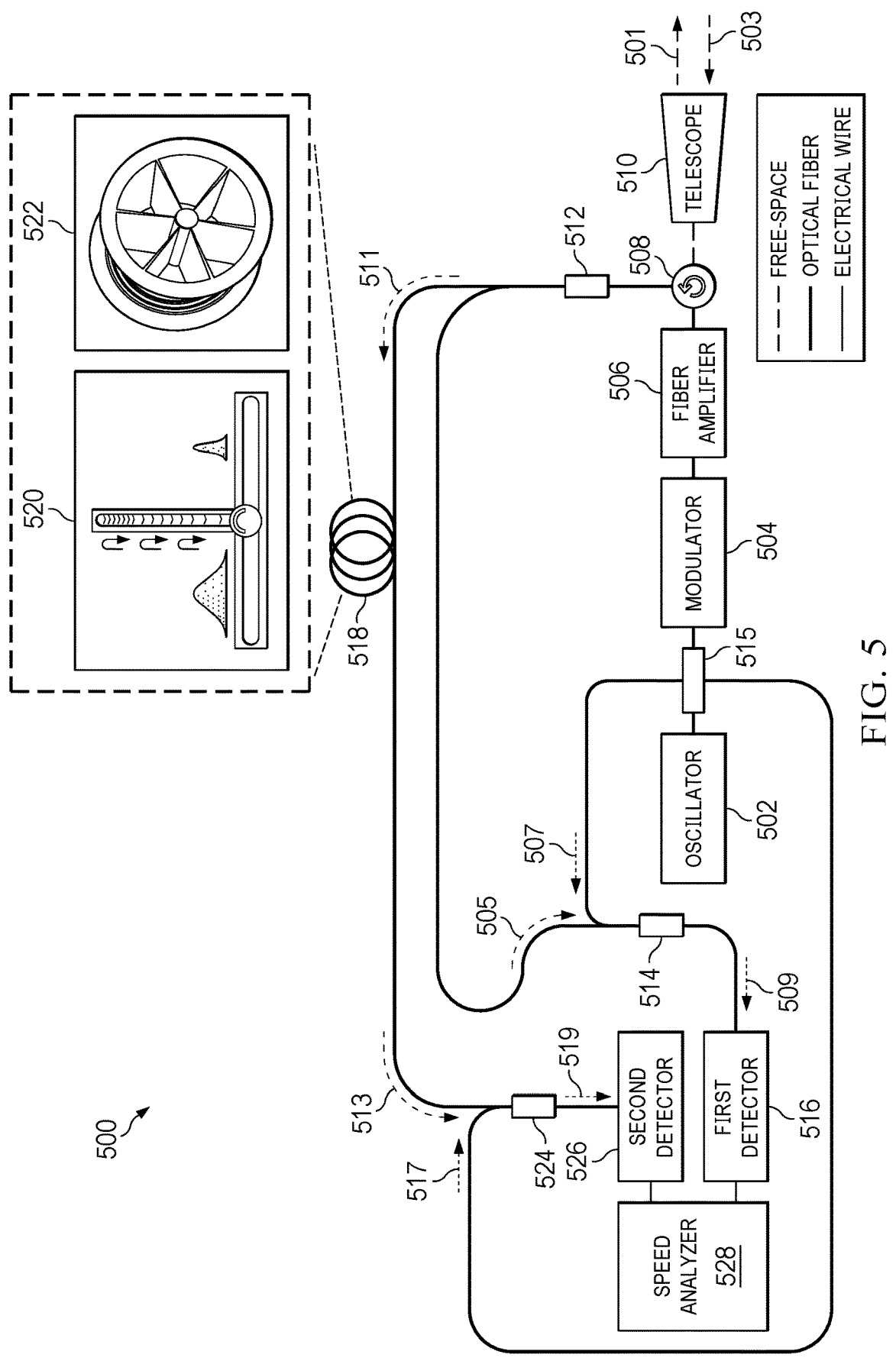
FIG. 5 is an illustration of a speed detection system in accordance with an illustrative embodiment.

With reference next to FIG. 5, an illustration of a speed detection system is depicted in accordance with an illustrative embodiment. In this illustrative example, speed detection system 500 is an example of an implementation for speed detection system 204 in FIG. 2.

As depicted, speed detection system 500 comprises a number of different components. For example, some of the components in speed detection system 500 are oscillator 502, modulator 504, and fiber amplifier 506. These components are examples of components that can be used to implement laser beam generator 206 in FIG. 2.

In this example, oscillator 502 is a coherent optical oscillator that operates to generate a coherent signal through resonant oscillation without needing an input signal. In this illustrative example, oscillator 502 generates the coherent light that is used to emit laser beam 501. Laser beam 501 is an outgoing laser beam and can also be referred to as outgoing laser light or a transmitted laser beam.

As depicted, oscillator 502 is connected to splitter 515, and splitter 515 is connected to modulator 504. Splitter 515 can be used to split off coherent light to form reference light in these examples.

In this illustrative example, modulator 504 is connected to oscillator 502 and operates to manipulate the property of the coherent light generated by oscillator 502. For example, modulator 504 can change or manipulate the coherent light to obtain desired property such as intensity, phase, polarization, or other property. Fiber amplifier 506 operates amplify or boost the coherent light generated by oscillator 502 and modulated by modulator 504. Fiber amplifier 506 is connected to circulator 508.

In this depicted example, circulator 508 is an optical circulator in the form of a three port device such that light entering a port exits on the next port in circulator 508. As depicted, the connections between oscillator 502, modulator 504, fiber amplifier 506, and circulator 508 are made using optical fibers.

In this illustrative example, circulator 508 is in communication with telescope 510. This communication can be through a connection using an optical fiber or through free space. Telescope 510 emits laser beam 501. In response to the emission or transmission of laser beam 501, backscatter light 503 can be received by telescope 510. Backscatter light 503 is received in response to the transmission of laser beam 501 into the atmosphere. Backscatter light 503 results from the scattering of laser beam 501 by various particles in the atmosphere. In this example, telescope 510 also operates as a receiver, such as receiver 207 FIG. 2. Backscatter light 503 travels to circulator 508 which directs backscatter light 503 to splitter 512 which is connected to one of the ports of circulator 508.

Splitter 512 is an optical splitter that splits backscatter light 503 into first portion 505 and second portion 511. In this example, each portion is 50% of backscatter light 503.

As depicted, first portion 505 of backscatter light 503 travels to first interference coupler 514. First interference coupler 514 can be, for example, a 3 DB coupler. First interference coupler 514 interferes first portion 505 of backscatter light 503 with first reference light 507 to generates first interfered light 509 that is sent to first detector 516. The interference results from first interference coupler 514 combining first portion 505 of backscatter light 503 and first reference light 507 with each other.

Second portion 511 of backscatter light 503 travels to dispersive optical fiber system 518. Dispersive optical fiber system 518 operates to introduce a time delay to second portion 511 of backscatter light 503. This time delay forms time delayed backscatter light 513 which is output by dispersive optical fiber system 518.

Dispersive optical fiber system 518 can take a number of different forms. For example, dispersive optical fiber system 518 can be selected from at least one of chirped fiber Bragg grating 520, single mode dispersion fiber 522, or some other suitable type of optical element that can introduce a time delay to second portion 511 of backscatter light 503. With chirped fiber Bragg grating 520, the frequency of the light increases, the delay introduced increases.

In this example, dispersive optical fiber system 518 is connected to second interference coupler 524. As depicted, second interference coupler 524 also as an input connected to splitter 515 and receives second reference light 517. Second interference coupler 524 interferes time delayed backscatter light 513 with second reference light 517 to form second interfered light 519. In other words, second interference coupler 524 combines the light with each other. The output of coupler is connected to second detector 526 such that second interfered light 519 is sent to second detector 526.

In this illustrative example, dispersive optical fiber system 518, first interference coupler 514, and second interference coupler 524 are examples of components that can be used in interference system 208 in FIG. 2.

In this illustrative example, first detector 516 and second detector 526 are examples of detectors that can be used to implement detection system 210 in FIG. 2. These detectors are hardware components that can detect power of light input into the detectors.

In this example, first detector 516 and second detector 526 can detect the power in first interfered light 509 and second interfered light 519. The power has a frequency that is a beat frequency resulting from interfering the backscatter light with the reference light.

For example, first interfered light 509 has a first beat frequency that occurs from interfering first portion 505 of backscatter light 503 with first reference light 507. Second interfered light 519 has a second beat frequency that occurs from interfering time delayed backscatter light 513 with second reference light 517.

In this depicted example, the connections depicted between components such as circulator 508, splitter 512, dispersive optical fiber system 518, first interference coupler 514, second interference coupler 524, first detector 516, and second detector 526 can be optical connections made using optical fibers.

First detector 516 and second detector 526 are connected to speed analyzer 528. In this illustrative example, these connections can be wired connections. In other illustrative examples, optical connections can be used.

Speed analyzer 528 is an example of speed analyzer 212 in FIG. 2 and can be at least one of a software process, hardware, or a combination thereof that operate to determine speed from the first beat frequency and the second beat frequency. For example, one of both the first beat frequency and the second beat frequency can be used to determine speed. Additionally, a difference such as a phase shift between the first beat frequency and the second beat frequency can also be used to determine speed. These two types of information can be used to determine speed with an increased level performance as compared to current speed analyzers.

In another illustrative example, speed detection system 500 can be an example of an implementation for speed detection system 300 in FIG. 3. For example, first path 304 can be implemented using first interference coupler 514. As another illustrative example, second path 306 can be implemented using dispersive optical fiber system 518 and second interference coupler 524. Further these paths can include optical fibers that connect these components to each other.

The illustration of speed detection system 500 in FIG. 5 is provided as an example of one implementation for speed detection system 204 in FIG. 2. This illustration is not meant to limit the manner in which speed analyzer 212 can be implemented in other illustrative examples. For example, in another illustrative example, fiber amplifier 506 may be omitted. In yet other illustrative examples, one or more modulators in addition to modulator 504 may be present. In still other illustrative examples, splitter 515 can be located in another location such as after fiber amplifier 506 or after modulator 504.

Figure 6:
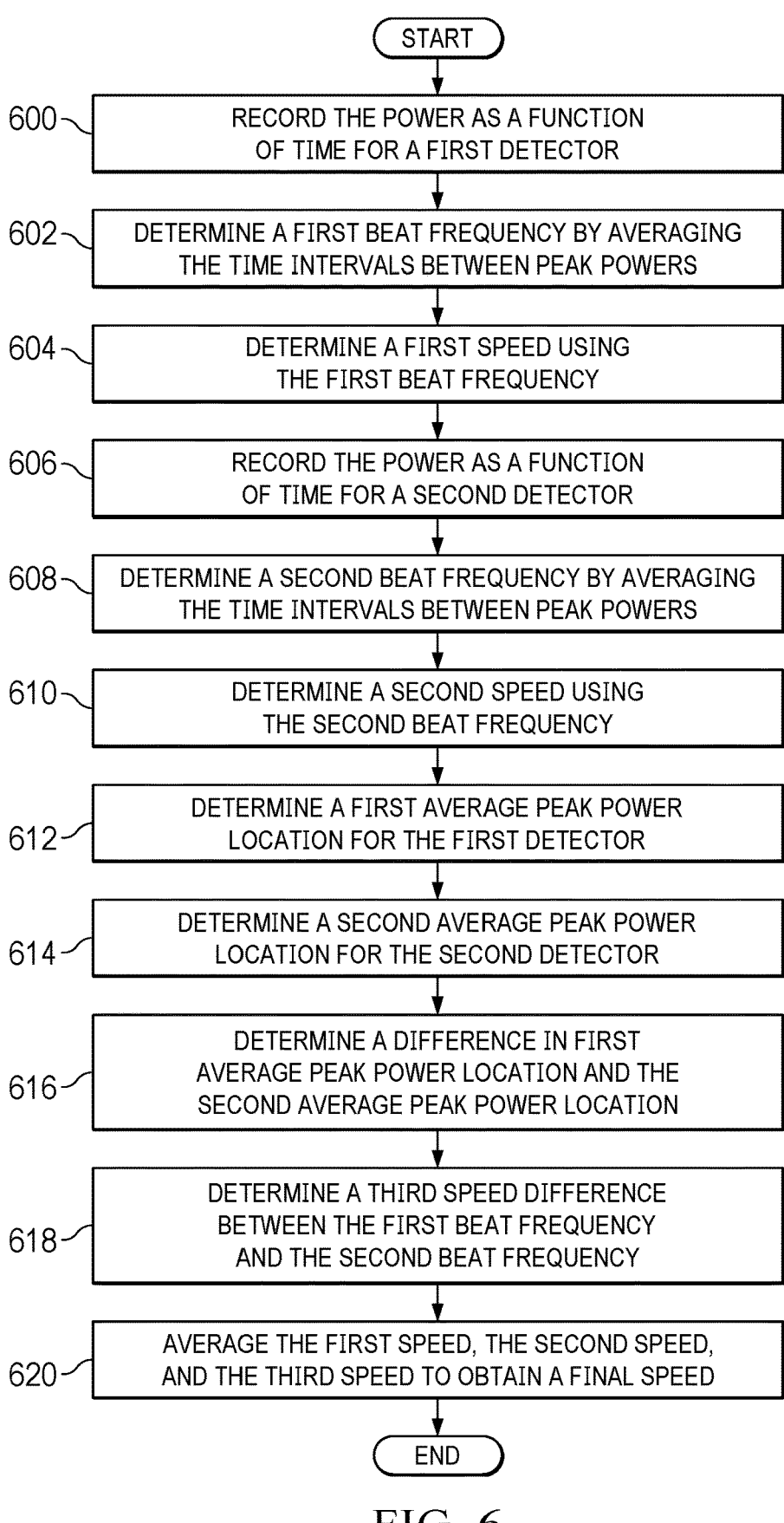
FIG. 6 is an illustration of a flowchart of a process for determining speed for a vehicle aircraft in accordance with an illustrative embodiment.

Turning next to FIG. 6, an illustration of a flowchart of a process for determining speed for a vehicle aircraft is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in speed analyzer 212 in FIG. 2, speed analyzer 308 in FIG. 3, and speed analyzer 528 in speed detection system 500 in FIG. 5. This process can be implemented to increase the accuracy in which the speed of the vehicle can be determined.

The process begins by recording the power as a function of time for a first detector (operation 600). The process determines a first beat frequency by averaging the time intervals between peak powers (operation 602). In operation 602, the beat frequency is fbeat=c/L where c is the speed of light and L is the peak to peak distance. The process determines a first speed using the first beat frequency (operation 604).

The process records the power as a function of time for a second detector (operation 606). The process determines a second beat frequency by averaging the time intervals between peak powers (operation 608). The process determines a second speed using the second beat frequency (operation 610).

The process determines a first average peak power location for the first detector (operation 612). The process determines a second average peak power location for the second detector (operation 614). The process determines a difference in first average peak power location and second average peak power location (operation 616). In operation 616, the difference is the time delay caused by the dispersive element.

The process determines a third speed difference between the first beat frequency and the second beat frequency (operation 618). In operation 618, the difference can be a time delay. The speed of a vehicle using the beat frequency can be determined as follows:

$$v=\lambda((fs-f))/2 \qquad (1)$$

where v is speed, $\lambda$=free space wavelength of laser beam, f=laser beam frequency, fs is backscattered laser light frequency, fbeat=fs−f=measured beat frequency created by interfering a reference light derived from the laser beam with the backscatter light.

To calculate the speed (v) using the beat shift ($\Delta t$), Equation 1 is used where fs is a function of the measured time delay ($\Delta t$) between power peaks from first detector 516 and the power peaks from second detector 526.

Using the relationship between fs and $\Delta t$, the value of fs is determined and used to calculate speed using Equation 1.

The process averages the first speed, the second speed, and the third speed to obtain a final speed (operation 620). The process terminates thereafter.

In another illustrative example, the phase difference can be determined by adding the power versus time curves for the first detector and the second detector together. In other words, the curves of power over time as detected by the first detector and the second detector can be added to each other.

The average standard deviation (STD) can be calculated for the added curves. The adding of power to time curves together can be performed for many different time shifts, and for each one of these time shifts, a standard deviation can be determined.

With this technique, the phases can be considered to be aligned when the standard deviation is at a maximum. Detecting when phases are off by a half cycle can occur when the standard deviation is at a minimum. As a result, knowing a first point where the standard deviation is at a maximum and a second point where the standard deviation is a minimum provides two endpoints. With these two endpoints, the existing phase shift can be determined because the phase shift falls in between these endpoints.

In this example the averaging the three speeds provides a more accurate speed than current techniques. In another illustrative example, the process in FIG. 6 can determine peak frequency by converting data through a fast Fourier transform to find the peak frequency instead of looking at power.

Turning next to FIG. 7, an illustration of a flowchart of a process for determining speed for a vehicle aircraft is depicted in accordance with an illustrative embodiment. The process in FIG. 7 can be implemented in hardware, software, or both. When implemented in software, the process can take the form of program instructions that is run by one of more processor units located in one or more hardware devices in one or more computer systems. For example, the process can be implemented in speed detection system 204 in FIG. 2, speed detection system 300 in FIG. 3, and speed detection system 500 in FIG. 5.

The process begins by receiving a backscatter light generated in response to transmitting a laser beam into an atmosphere during movement of the vehicle (operation 700). The process measures a first beat frequency from interfering a first portion of the backscatter light with a reference light derived from the laser beam (operation 702). The process introduces a time delay to a second portion of the backscatter light to form a time delayed backscatter light (operation 704). The process measures a second beat frequency from interfering the time delayed backscatter light with the reference light (operation 706). In operation 706, the second beat frequency is time delayed from the first beat frequency.

The process determines a difference between the first beat frequency and the second beat frequency (operation 708). The process determines the speed of the vehicle using the difference between the first beat frequency and the second beat frequency (operation 710). The process terminates thereafter.

Figure 8:
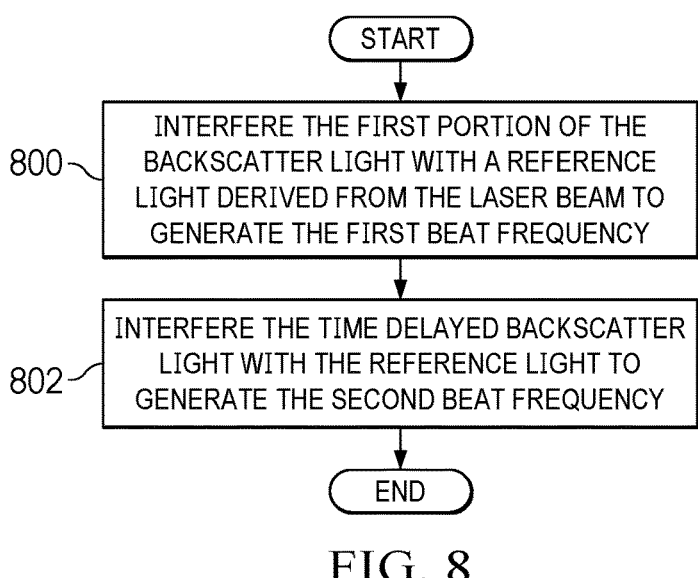
FIG. 8 is an illustration of a flowchart of a process for interfering a backscatter light with a reference light to generate a beat frequency in accordance with an illustrative embodiment.

With reference to FIG. 8, an illustration of a flowchart of a process for interfering a backscatter light with a reference light to generate a beat frequency is depicted in accordance with an illustrative embodiment. The operations in FIG. 8 are examples of additional operations that can be used with the operations in the process in FIG. 7.

The process begins by interfering the first portion of the backscatter light with a reference light derived from the laser beam to generate the first beat frequency (operation 800). The process interferes the time delayed backscatter light with the reference light to generate the second beat frequency (operation 802). The process terminates thereafter.

Figure 9:
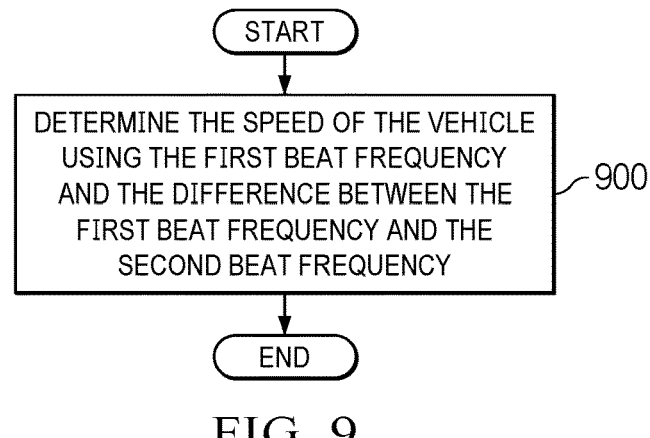
FIG. 9 is an illustration of a flowchart of a process for determining a speed of a vehicle using a difference between a beat frequency and a time delayed beat frequency in accordance with an illustrative embodiment.

Turning to FIG. 9, an illustration of a flowchart of a process for determining a speed of a vehicle using a difference between a beat frequency and a time delayed beat frequency is depicted in accordance with an illustrative embodiment. The process in FIG. 9 is an example of an implementation of operation 710 in FIG. 7. The process determines the speed of the vehicle using the first beat frequency and the difference between the first beat frequency and the second beat frequency (operation 900). The process terminates thereafter. In other examples, the speed of the vehicle can be determined in operation 900 using the second beat frequency and the difference between the first beat frequency and the second beat frequency.

Figure 10:
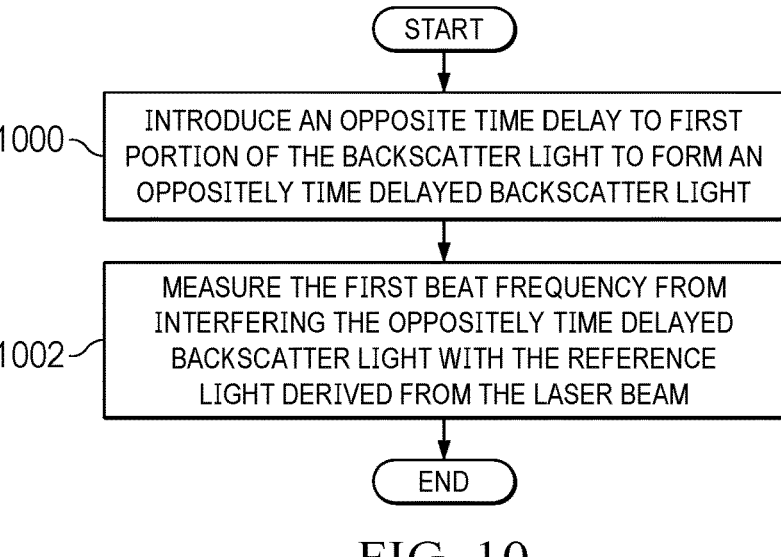
FIG. 10 is an illustration of a flowchart of a process for measuring a beat frequency from interfering an oppositely time delayed backscatter light with a reference light in accordance with an illustrative embodiment.

With reference to FIG. 10, an illustration of a flowchart of a process for measuring a beat frequency from interfering an oppositely time delayed backscatter light with a reference light is depicted in accordance with an illustrative embodiment. Operation 1000 in FIG. 10 is an example of an additional operation that can be used with the operations in the process in FIG. 7 and operation 1002 in FIG. 10 is an example of an implementation of operation 702 in FIG. 7.

The process begins by introducing an opposite time delay to first portion of the backscatter light to form an oppositely time delayed backscatter light (operation 1000). The process measures the first beat frequency from interfering the oppositely time delayed backscatter light with the reference light derived from the laser beam (operation 1002). The process terminates thereafter.

Figure 11:
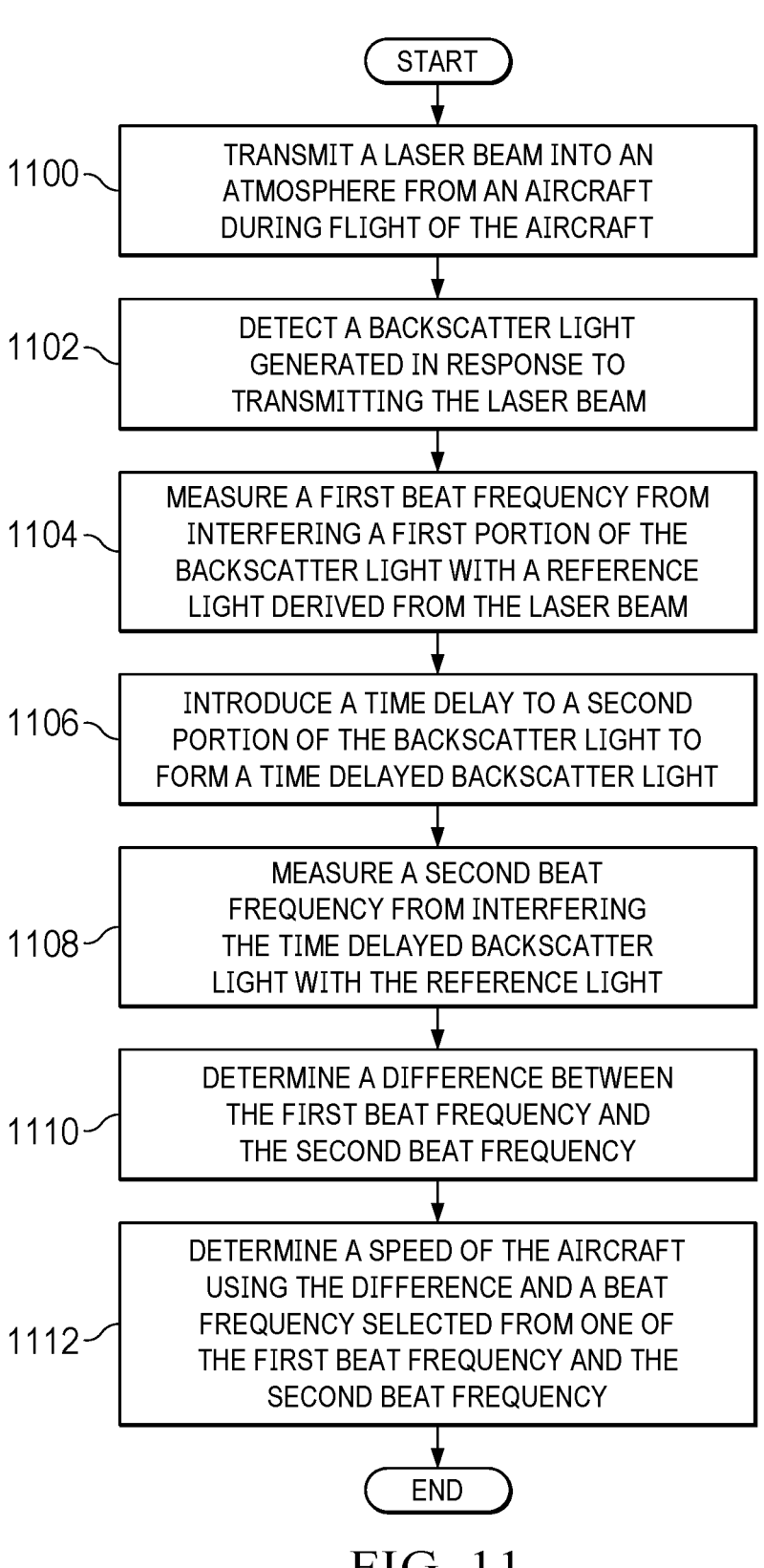
FIG. 11 is an illustration of a flowchart of a process for detecting a speed of an aircraft in accordance with an illustrative embodiment.

Turning next to FIG. 11, an illustration of a flowchart of a process for detecting a speed of an aircraft is depicted in accordance with an illustrative embodiment. The process in FIG. 11 can be implemented in hardware, software, or both. When implemented in software, the process can take the form of program instructions that is run by one of more processor units located in one or more hardware devices in one or more computer systems. For example, the process can be implemented in speed detection system 204 in FIG. 2, detection system 300 in FIG. 3, and speed detection system 500 in FIG. 5.

The process begins by transmitting a laser beam into an atmosphere from an aircraft during flight of the aircraft (operation 1100). The process receives a backscatter light generated in response to transmitting the laser beam (operation 1102). The process measures a first beat frequency from interfering a first portion of the backscatter light with a reference light derived from the laser beam (operation 1104). The process introduces a time delay to a second portion of the backscatter light to form a time delayed backscatter light (operation 1106). The process measures a second beat frequency from interfering the time delayed backscatter light with the reference light (operation 1108). The process determines a difference between the first beat frequency and the second beat frequency (operation 1110). The process determines a speed of the aircraft using the difference and a beat frequency selected from one of the first beat frequency and the second beat frequency (operation 1112). The process terminates thereafter. In operation 1112, the beat frequency can be first beat frequency or the second beat frequency.

Figure 12:
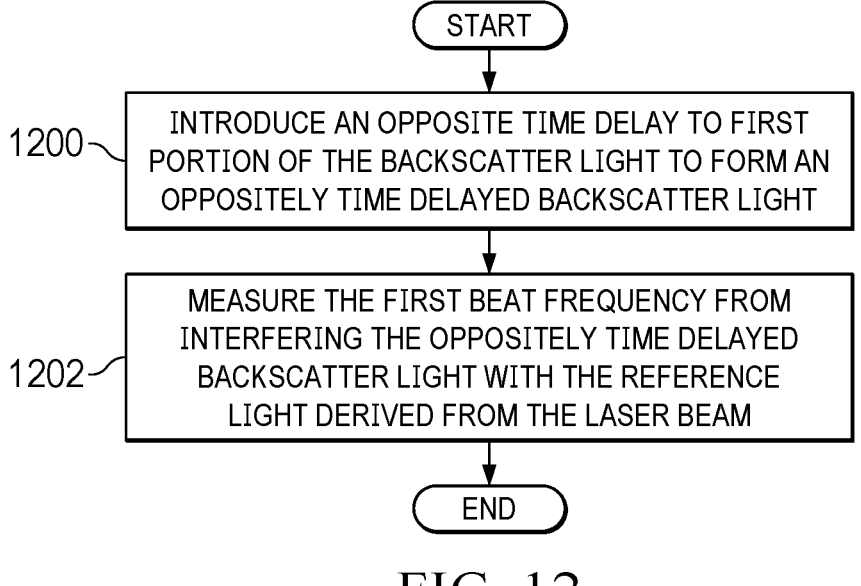
FIG. 12 is an illustration of a flowchart of a process for measuring a beat frequency from interfering an oppositely time delayed backscatter light with a reference light in accordance with an illustrative embodiment.

With reference to FIG. 12, an illustration of a flowchart of a process for measuring a beat frequency from interfering an oppositely time delayed backscatter light with a reference light is depicted in accordance with an illustrative embodiment. Operation 1200 in FIG. 12 is an example of an additional operation that can be used with the operations in the process in FIG. 11 and operation 1202 in FIG. 12 is an example of an implementation of operation 1104 in FIG. 11.

The process begins by introducing an opposite time delay to first portion of the backscatter light to form an oppositely time delayed backscatter light (operation 1200). The process measures the first beat frequency from interfering the oppositely time delayed backscatter light with the reference light derived from the laser beam (operation 1202). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
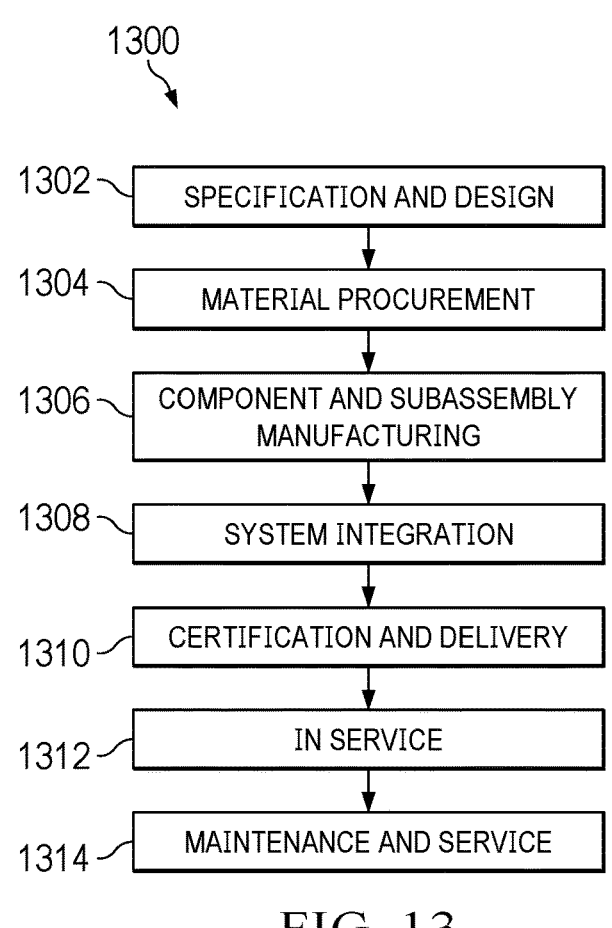
FIG. 13 is an illustration of an aircraft manufacturing and service method in accordance with an illustrative embodiment.
Figure 14:
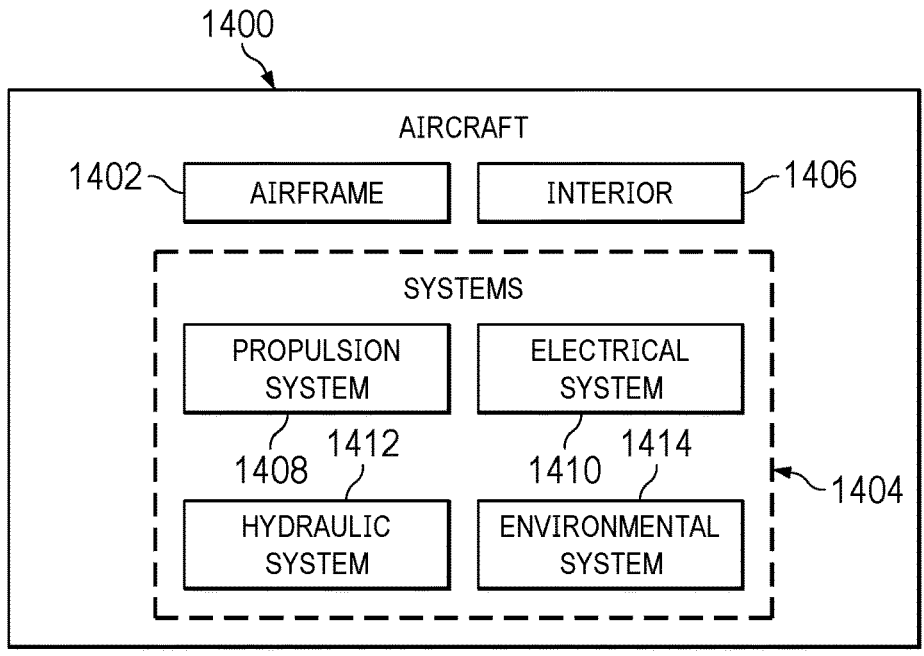
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially increase the ability of aircraft 1400 to detect speed during flight at various altitudes with the desired level of performance.

For example, a speed detection system in the illustrative examples can be implemented during system integration 1308. This speed detection system can also be added to aircraft 1400 during maintenance and service 1314. This addition can be made during modification, reconfiguration, refurbishment, and other maintenance or service.

Further, the use of the speed detection system can occur during in service 1312 in a manner that provides increased performance in detecting the speed of aircraft 1400 during flight. The accuracy of detecting speed can occur during various flight elevations including mid-level elevations where lower density of particles can be present as compared to other elevations.

Some features of the illustrative examples are described in the following clauses. These clauses are examples of features not intended to limit other illustrative examples.

Clause 1

A method for detecting a speed of a vehicle, the method comprising:

receiving a backscatter light generated in response to transmitting a laser beam into an atmosphere during movement of the vehicle;

measuring a first beat frequency from interfering a first portion of the backscatter light with a reference light derived from the laser beam;

introducing a time delay to a second portion of the backscatter light to form a time delayed backscatter light;

measuring a second beat frequency from interfering the time delayed backscatter light with the reference light, wherein the second beat frequency is time delayed from the first beat frequency;

determining a difference between the first beat frequency and the second beat frequency; and determining the speed of the vehicle using the difference between the first beat frequency and the second beat frequency.

Clause 2

The method according to clause 1 further comprising:

interfering the first portion of the backscatter light with the reference light derived from the laser beam to generate the first beat frequency; and interfering the time delayed backscatter light with the reference light to generate the second beat frequency.

Clause 3

The method according to one of clauses 1 or 2, wherein determining the speed of the vehicle using the difference between the first beat frequency and the second beat frequency comprises:

determining the speed of the vehicle using the first beat frequency and the difference between the first beat frequency and the second beat frequency.

Clause 4

The method according to one of clauses 1, 2, or 3 further comprising:

introducing an opposite time delay to the first portion of the backscatter light to form an oppositely time delayed backscatter light;

wherein measuring the first beat frequency from interfering the first portion of the backscatter light with the reference light derived from the laser beam comprises:

measuring the first beat frequency from interfering the oppositely time delayed backscatter light with the reference light derived from the laser beam.

Clause 5

The method according to one of clauses 1, 2, 3, or 4, wherein the time delay is dependent on a frequency of the backscatter light.

Clause 6

The method according to one of clauses 1, 2, 3, 4, or 5, wherein the difference is selected from one of a phase difference and a time difference.

Clause 7

The method according to one of clauses 1, 2, 3, 4, 5, or 6, wherein the first beat frequency is for a first power signal and the second beat frequency is for a second power signal.

Clause 8

The method according to one of clauses 1, 2, 3, 4, 5, 6, or 7, wherein the time delay is introduced using at least one of a chirped fiber Bragg grating or a single mode dispersion fiber.

Clause 9

The method according to one of clauses 1, 2, 3, 4, 5, 6, 7, or 8, wherein the vehicle is selected from one of a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, an automobile, and a motorcycle.

Clause 10

A method for detecting speed of an aircraft, the method comprising:

transmitting a laser beam into an atmosphere from the aircraft during flight of the aircraft;

receiving a backscatter light generated in response to transmitting the laser beam;

measuring a first beat frequency from interfering a first portion of the backscatter light with a reference light derived from the laser beam;

introducing a time delay to a second portion of the backscatter light to form a time delayed backscatter light;

measuring a second beat frequency from interfering the time delayed backscatter light with the reference light;

determining a difference between the first beat frequency and the second beat frequency; and determining a speed of the aircraft using the difference and a beat frequency selected from one of the first beat frequency and the second beat frequency.

Clause 11

The method according to clause 10 further comprising:

introducing an opposite time delay to the first portion of the backscatter light to form an oppositely time delayed backscatter light;

wherein measuring the first beat frequency from interfering the first portion of the backscatter light with the reference light derived from the laser beam comprises:

measuring the first beat frequency from interfering the oppositely time delayed backscatter light with the reference light derived from the laser beam.

Clause 12

The method according to one of clauses 10 or 11, wherein the time delay is dependent on a frequency of the backscatter light.

Clause 13

A speed detection system comprising:

a laser beam generator configured to emit a laser beam into an atmosphere from a vehicle;

an interference system configured to interfere a first portion of a backscatter light received with a reference light to form a first beat frequency, introduce a time delay to a second portion of the backscatter light to form a time delayed backscatter light, and interfere the time delayed backscatter light with the reference light to form a second beat frequency, wherein the backscatter light is received in response to the laser beam being emitted into the atmosphere and the reference light is derived from the laser beam;

a detection system configured to measure a first beat frequency from frequency from interfering the first portion of the backscatter light with the reference light and measure the second beat frequency from interfering the time delayed backscatter light with the reference light; and a speed analyzer configured to determine a speed for the vehicle using the first beat frequency and a difference between the first beat frequency and the second beat frequency.

Clause 14

The speed detection system according to clause 13, wherein the interference system comprises:

a first interference coupler having an output connected to the detection system, wherein the first interference coupler interferes the first portion of a backscatter light received with the reference light;

a time delay system having an input and an output, wherein the input receives the second portion of the backscatter light and wherein the time delay system introduces the time delay to the second portion of the backscatter light; and a second interference coupler having an input connected to the output of the time delay system having an output connected to the detection system, wherein the second interference coupler interferes the time delayed backscatter light with the reference light.

Clause 15

The speed detection system according to one of clauses 13 or 14, wherein the interference system is configured to:

introduce an opposite time delay to a first portion of the backscatter light to form an oppositely time delayed backscatter light;

wherein in measuring the first beat frequency from interfering the first portion of the backscatter light with the reference light derived from the laser beam, the detection system is configured to:

measure the first beat frequency from interfering the oppositely time delayed backscatter light with the reference light derived from the laser beam.

Clause 16

The speed detection system according to one of clauses 13, 14, or 15, wherein the time delay system is selected at least one of a chirped fiber Bragg grating or a single mode dispersion fiber.

Clause 17

The speed detection system according to one of clauses 13, 14, 15, or 16, wherein the difference is selected from one of a phase difference and a time difference.

Clause 18

The speed detection system according to one of clauses 13, 14, 15, 16, or 17, wherein the vehicle is selected from one of one of a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile and motorcycle.

Clause 19

A speed detection system comprising:

a laser beam generator configured to emit a laser beam into an atmosphere from a vehicle;

a first path that interferes a first portion of a backscatter light received with a reference light and measures a first beat frequency from the first portion of the backscatter light interfered with the reference light;

a second path that introduces a time delay to a second portion of the backscatter light to form a time delayed backscatter light, interferes the time delayed backscatter light with the reference light, and measures a second beat frequency from interfering the time delayed backscatter light with the reference light; and a speed analyzer that is in communication with the first path and the second path, wherein the speed analyzer receives the first beat frequency from the first path, receives the second beat frequency from the second path, and determines a speed of the vehicle using the first beat frequency and determines the speed using the second beat frequency in response to the first path being out of tolerance.

Clause 20

The speed detection system according to clause 19, wherein the first path comprises:

a first interference coupler connected to a backscatter splitter and a laser beam splitter, wherein the first interference coupler receives the first portion of the backscatter light from the backscatter splitter, a first reference light from the laser beam splitter, interferes the first portion of the backscatter light with the first reference light; and outputs a first signal having the first beat frequency; and a first detector connected to the first interference coupler, wherein the first detector measures the first beat frequency of a first interfered light output by the first interference coupler;

wherein the second path comprises:

a time delay system connected to the backscatter splitter, wherein the time delay system receives the second portion of the backscatter light from the backscatter splitter and introduces the time delay to the second portion of the backscatter light to form the time delayed backscatter light; and a second interference coupler connected to the time delay system and the laser beam splitter, wherein the second interference coupler receives the time delayed backscatter light, receives a second reference light from the laser beam splitter, interferes the time delayed backscatter light with the second reference light; and outputs a second interfered light having the second beat frequency.

Clause 21

The speed detection system according to one of clauses 19 or 20, wherein the speed analyzer determines the speed using the first beat frequency and a difference between the first beat frequency and the second beat frequency.

Clause 22

A speed detection system comprising:

a laser beam generator configured to emit a laser beam into an atmosphere from a vehicle;

an interference system configured to interfere a first portion of a backscatter light received with a reference light to form a first beat frequency, introduce a time delay to a second portion of the backscatter light to form a time delayed backscatter light, and interfere the time delayed backscatter light with the reference light to form a second beat frequency, wherein the backscatter light is detected in response to the laser beam being emitted into the atmosphere and the reference light is derived from the laser beam;

a detection system configured to measure the first beat frequency from frequency from interfering the first portion of the backscatter light with the reference light and measure the second beat frequency from interfering the time delayed backscatter light with the reference light; and a speed analyzer configured to determine a first speed using the first beat frequency; determine a second speed using the second beat frequency; determine a third speed using a difference between the first beat frequency and the second beat frequency; and determine a speed for the vehicle as an average of the first speed, the second speed, and the third speed.

Thus, the illustrative embodiments provide a method, apparatus, and system that detects a speed of a vehicle, the method. A backscatter light generated in response to transmitting a laser beam into an atmosphere during movement of the vehicle is received. A first beat frequency from interfering a first portion of the backscatter light with a reference light derived from the laser beam is measured. A time delay is introduced to a second portion of the backscatter light to form a time delayed backscatter light. A second beat frequency from interfering the time delayed backscatter light with the reference light is measured. The second beat frequency is time delayed from the first beat frequency. A difference between the first beat frequency and the second beat frequency is determined. The speed of the vehicle using the difference between the first beat frequency and the second beat frequency is determined.

Additionally, the speed can also be determined using at least one of the first beat frequency or the second beat frequency in addition to using the difference. The additional information can provide improved performance in determining speed in environmental conditions where the amount of backscatter light can be reduced because of lower levels of particles in the atmosphere. In the illustrative examples, this additional information can improve performance as compared to determining speed using a frequency shift of a beat frequency from interfering backscatter light with a reference light using current techniques.

Further, the illustrative examples provide increased flexibility in using different amounts of information to determine the speed of the vehicle such as aircraft. In the illustrative example, at least one of the first beat frequency, the second beat frequency, or the difference between the first beat frequency and the second beat frequency can be used. This flexibility enables determining speed and providing redundancy in case of components not performing within a specified tolerance.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting a speed of a vehicle, the method comprising:

receiving a backscatter light generated in response to transmitting a laser beam into an atmosphere during movement of the vehicle;

measuring a first beat frequency from interfering a first portion of the backscatter light with a reference light derived from the laser beam;

introducing a time delay to a second portion of the backscatter light to form a time delayed backscatter light;

measuring a second beat frequency from interfering the time delayed backscatter light with the reference light, wherein the second beat frequency is time delayed from the first beat frequency;

determining a difference between the first beat frequency and the second beat frequency; and determining the speed of the vehicle using the difference between the first beat frequency and the second beat frequency.

2. The method of claim 1, further comprising:

interfering the first portion of the backscatter light with the reference light derived from the laser beam to generate the first beat frequency; and interfering the time delayed backscatter light with the reference light to generate the second beat frequency.

3. The method of claim 1, wherein determining the speed of the vehicle using the difference between the first beat frequency and the second beat frequency comprises:

determining the speed of the vehicle using the first beat frequency and the difference between the first beat frequency and the second beat frequency.

4. The method of claim 1, further comprising:

introducing an opposite time delay to the first portion of the backscatter light to form an oppositely time delayed backscatter light, wherein measuring the first beat frequency from interfering the first portion of the backscatter light with the reference light derived from the laser beam comprises measuring the first beat frequency from interfering the oppositely time delayed backscatter light with the reference light derived from the laser beam.

5. The method of claim 1, wherein the time delay is dependent on a frequency of the backscatter light.

6. The method of claim 1, wherein the difference is selected from one of a phase difference and a time difference.

7. The method of claim 1, wherein the first beat frequency is for a first power signal and the second beat frequency is for a second power signal.

8. The method of claim 1, wherein the time delay is introduced using at least one of a chirped fiber Bragg grating or a single mode dispersion fiber.

9. The method of claim 1, wherein the vehicle is selected from one of a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, an automobile, and a motorcycle.

10. A method for detecting speed of an aircraft, the method comprising:

transmitting a laser beam into an atmosphere from the aircraft during flight of the aircraft;

receiving a backscatter light generated in response to transmitting the laser beam;

measuring a first beat frequency from interfering a first portion of the backscatter light with a reference light derived from the laser beam;

introducing a time delay to a second portion of the backscatter light to form a time delayed backscatter light;

measuring a second beat frequency from interfering the time delayed backscatter light with the reference light;

determining a difference between the first beat frequency and the second beat frequency; and determining a speed of the aircraft using the difference and a beat frequency selected from one of the first beat frequency and the second beat frequency.

11. The method of claim 10, further comprising:

introducing an opposite time delay to the first portion of the backscatter light to form an oppositely time delayed backscatter light, wherein measuring the first beat frequency from interfering the first portion of the backscatter light with the reference light derived from the laser beam comprises measuring the first beat frequency from interfering the oppositely time delayed backscatter light with the reference light derived from the laser beam.

12. The method of claim 10, wherein the time delay is dependent on a frequency of the backscatter light.

13. A speed detection system that comprises:

a laser beam generator configured to emit a laser beam into an atmosphere from a vehicle;

an interference system configured to: interfere a first portion of a backscatter light received with a reference light to form a first beat frequency; introduce a time delay to a second portion of the backscatter light to form a time delayed backscatter light; and interfere the time delayed backscatter light with the reference light to form a second beat frequency, wherein the backscatter light is received in response to the laser beam being emitted into the atmosphere and the reference light is derived from the laser beam;

a detection system configured to measure a first beat frequency from interfering the first portion of the backscatter light with the reference light and measure the second beat frequency from interfering the time delayed backscatter light with the reference light; and a speed analyzer configured to determine a speed for the vehicle using the first beat frequency and a difference between the first beat frequency and the second beat frequency.

14. The speed detection system of claim 13, wherein the interference system comprises:

a first interference coupler having an output connected to the detection system, wherein the first interference coupler interferes the first portion of a backscatter light received with the reference light;

a time delay system having an input and an output, wherein the input receives the second portion of the backscatter light and wherein the time delay system introduces the time delay to the second portion of the backscatter light; and a second interference coupler having an input connected to the output of the time delay system having an output connected to the detection system, wherein the second interference coupler interferes the time delayed backscatter light with the reference light.

15. The speed detection system of claim 13, wherein the interference system is configured to:

introduce an opposite time delay to a first portion of the backscatter light to form an oppositely time delayed backscatter light;

wherein in measuring the first beat frequency from interfering the first portion of the backscatter light with the reference light derived from the laser beam, the detection system is configured to:

measure the first beat frequency from interfering the oppositely time delayed backscatter light with the reference light derived from the laser beam.

16. The speed detection system of claim 14, wherein the time delay system is selected at least one of a chirped fiber Bragg grating or a single mode dispersion fiber.

17. The speed detection system of claim 14, wherein the difference is selected from one of a phase difference and a time difference.

18. The speed detection system of claim 13, wherein the vehicle is selected from one of one of a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile and motorcycle.

19. A speed detection system comprising:

a laser beam generator configured to emit a laser beam into an atmosphere from a vehicle;

a first path that interferes a first portion of a backscatter light received with a reference light and measures a first beat frequency from the first portion of the backscatter light interfered with the reference light;

a second path that introduces a time delay to a second portion of the backscatter light to form a time delayed backscatter light, interferes the time delayed backscatter light with the reference light, and measures a second beat frequency from interfering the time delayed backscatter light with the reference light; and a speed analyzer that is in communication with the first path and the second path, wherein the speed analyzer receives the first beat frequency from the first path, receives the second beat frequency from the second path, and determines a speed of the vehicle using the first beat frequency and determines the speed using the second beat frequency in response to the first path being out of tolerance.

20. The speed detection system of claim 19, wherein the first path comprises:

a first interference coupler connected to a backscatter splitter and a laser beam splitter, wherein the first interference coupler receives the first portion of the backscatter light from the backscatter splitter, a first reference light from the laser beam splitter, interferes the first portion of the backscatter light with the first reference light; and outputs a first signal having the first beat frequency; and a first detector connected to the first interference coupler, wherein the first detector measures the first beat frequency of a first interfered light output by the first interference coupler;

wherein the second path comprises:

a time delay system connected to the backscatter splitter, wherein the time delay system receives the second portion of the backscatter light from the backscatter splitter and introduces the time delay to the second portion of the backscatter light to form the time delayed backscatter light; and a second interference coupler connected to the time delay system and the laser beam splitter, wherein the second interference coupler receives the time delayed backscatter light, receives a second reference light from the laser beam splitter, interferes the time delayed backscatter light with the second reference light; and outputs a second interfered light having the second beat frequency.

21. The speed detection system of claim 19, wherein the speed analyzer determines the speed using the first beat frequency and a difference between the first beat frequency and the second beat frequency.

22. A speed detection system comprising:

a laser beam generator configured to emit a laser beam into an atmosphere from a vehicle;

an interference system configured to interfere a first portion of a backscatter light received with a reference light to form a first beat frequency, introduce a time delay to a second portion of the backscatter light to form a time delayed backscatter light, and interfere the time delayed backscatter light with the reference light to form a second beat frequency, wherein the backscatter light is received in response to the laser beam being emitted into the atmosphere and the reference light is derived from the laser beam;

a detection system configured to measure a first beat frequency from interfering the first portion of the backscatter light with the reference light and measure the second beat frequency from interfering the time delayed backscatter light with the reference light; and a speed analyzer configured to determine a first speed using the first beat frequency; determine a second speed using the second beat frequency; determine a third speed using a difference between the first beat frequency and the second beat frequency; and determine a speed for the vehicle as an average of the first speed, the second speed, and the third speed.

* * * * *